Patented Oct. 27, 1931

1,829,130

UNITED STATES PATENT OFFICE

GEORGE HOLLAND ELLIS, OF SPONDON, NEAR DERBY, ENGLAND, ASSIGNOR TO CELANESE CORPORATION OF AMERICA, A CORPORATION OF DELAWARE

DYEING OR COLORING OF CELLULOSE ACETATE

No Drawing. Application filed October 3, 1925, Serial No. 60,341, and in Great Britain October 8, 1924.

This invention relates to the dyeing (which term likewise includes printing or otherwise coloring) of cellulose acetate or yarns, fabrics or other products or articles consisting of or containing the same (all of which are hereinafter included in the term materials comprising cellulose acetate) by the azoic or diazotization and development process.

It has previously been proposed to employ in such processes as components diamido-azo-benzene derivatives and substitution derivatives thereof, such as for example paramido-benzene-azo-dimethylaniline. Thus it has been proposed for example to dye rich black shades upon acetyl cellulose by coupling paramido-benzene-azo-dimethylaniline and beta-hydroxy-naphthoic acid on the fibre, the former component being employed in the form of a solution of its hydrochloride.

I have now found that a valuable wide range of deep and full shades, particularly navy blues and blacks, can be obtained on acetyl cellulose by the diazotization and development process by the use as base components of azo compounds (in which term I likewise include polyazo compounds) which contain alpha-naphthylamine as an end component. Such azo compounds may belong to the various series as for example benzene-azo-alphanaphthylamine series, naphtha-lene-azo-alphanaphthylamine series, benzene-azo, benzene-azo-alphanaphthylamine series, benzene - azo - naphthalene - azo - alphanaph-thylamine series, and may comprise the various substitution products such as the methoxy, methyl, and amino derivatives, for example paramidobenzene - azo - alphanaphthylamine, paramethoxy - benzene - azo - alphanaphthyl-amine, orthotoluene - azo - alphanaphthylam-ine, orthotoluene-azo-orthotoluene-azo-alpha-naphthylamine.

In practising the invention the aforesaid azo compounds may be applied to the goods in any known or suitable manner, for example in form of solution of their hydrochlorides, where such are soluble. They are preferably, however, applied in form of their soluble or more soluble modifications prepared in accordance with the processes described in my U. S. Patents Nos. 1,618,413 granted February 22, 1927, 1,690,481 granted November 6, 1928 and 1,694,413 granted December 11, 1928, that is to say, by treatment with solubilizing agents such as referred to in the said specifications. The solubilizing agents of my previous U. S. Patent No. 1,618,413, dated February 22, 1927, are, as therein stated, sulphoricinoleic acid or other sulphonated fatty acid or other bodies having oily or fatty characteristics namely higher fatty acids or sulphonated or other derivatives thereof containing salt-forming groups, or salts of such acids or bodies as for instance their alkali or ammonium salts.

Corresponding to what is stated in the said U. S. Patent No. 1,618,413, dated February 22, 1927, the solubilization of the azo compounds of the present invention may be effected by stirring up or treating them with one or more of the said solubilizing agents, heating if necessary, and the mass can afterwards be diluted with water or aqueous alkali, filtered if required, and added to the dyebaths. Solid "solutions" or concentrated solubilized preparations of the said azo compounds may be made by heating them with the body or bodies of oily or fatty characteristics, for instance oleic, stearic, palmitic or sulphoricinoleic acid etc. (or their salts) either by treatment in presence of little or no water, or by treatment in presence of larger quantities of water with subsequent concentration or drying. The concentrated solubilized preparations may be diluted with hot water and added to the dyebath.

For printing and stencilling, the solubilized modifications of the said azo compounds obtained by pretreating them as before mentioned with one or more solubilizing agents of the class referred to, may be dissolved in water and thickened with starch, gum, dextrin, flour or the like to form the necessary pastes.

As before stated, said class of solubilizing agents comprises sulphoricinoleic or other sulphonated fatty acids or other bodies having oily or fatty characteristics, namely higher fatty acids or sulphonated or other derivatives thereof containing salt-forming groups, and also salts of such acids or bodies, for instance their alkali or ammonium salts, and for simplicity the said solubilizing agents, including the salts, are herein (as in the said U. S. Patent No. 1,618,413, dated February 22, 1927) all included in the claims in the term body of oily or fatty characteristics.

The azo compounds of the present invention may also, as above stated, be applied to the goods of or containing cellulose acetate, by the processes described in previous U. S. Patent No. 1,690,481 dated November 6, 1928 or Patent No. 1,694,413 dated December 11, 1928, that is to say the azo compounds may be solubilized by pretreatment with the solubilizing agents referred to in said Patent Nos. 1,690,481 and 1,694,413 in a manner similar to that indicated for the solubilizing agents of Patent No. 1,618,413, dated February 22, 1927, and the solubilized modifications may be similarly applied to the goods.

After absorption of the aforesaid azo compounds the goods are subjected to diazotization and development in any known or suitable manner. The choice of developers will of course largely govern the resultant shades and fastness properties. I have found that particularly valuable results may be obtained by the coupling on the goods of paramidobenzene-azo-alphanaphthylamine or substitution products thereof with beta-hydroxy-naphthoic acid or the arylide or substituted arylide derivatives thereof, the resulting shades showing considerable superiority in regard to resistance to light and alkalies over results previously obtainable. Valuable results may also be obtained by using developers other than beta-hydroxy-naphthoic acid, thus for example the following shades may be obtained:—with phenol red; with resorcine, bluish maroon; with betanaphthol, purple; with beta-hydroxy-naphthoic acid anilide, navy blue; with dimethylaniline, deep maroon; with meta-phenylenediamine, a black which is somewhat browner in shade than the black yielded with beta-hydroxy-naphthoic acid.

The following example is given by way of illustration of the present invention, it being understood that it may be varied widely and is in no way limitative.

Example 2 lbs. para-amidobenzene-azo-alphanaphthylamine are finely ground and heated up with 15 to 20 lbs. of 50% sodium sulphoricinoleate until solubilization is as complete as possible. The mass is then diluted with boiling water and added to a bath containing 300 gallons of soft water at 60° C. 100 lbs. of acetyl cellulose in hank or other form are worked into the bath until the maximum possible amount of the component is absorbed, the temperature being raised to 80° C. if desired. The goods are then removed, rinsed and diazotized for about half an hour in a bath composed of 5 lbs. sodium nitrite and 1¾ gallons of hydrochloric acid of 32° Tw. dissolved in 250 gallons of cold water. The goods are then removed, rinsed and developed for about ¾ hour at 60° C. in a bath containing 3 lbs. sodium beta-hydroxy-naphthoate and 3 lbs. of 90% formic acid. After development the goods may be soaped and finished as desired. The process of this example produces extremely full rich black on acetyl cellulose which is very fast to light and soaping.

What I claim and desire to secure by Letters Patent is:—

1. Process for dyeing materials comprising cellulose acetate, said process comprising treating said materials with a base being an azo compound containing alphanaphthylamine as an end component, diazotizing said base within the material and coupling with a developer.

2. Process for dyeing materials comprising cellulose acetate, said process comprising treating said materials with a base being an azo compound containing alphanaphthylamine as an end component, diazotizing said base within the material and coupling with beta-hydroxy-naphthoic acid.

3. Process for dyeing materials comprising cellulose acetate, said process comprising treating said materials with a base being an azo compound containing alphanaphthylamine as an end component,—said base being applied in the form of a solubilized modification prepared by pretreatment of said base with a solubilizing agent comprising a body of oily or fatty characteristics,—diazotizing said base within the material and coupling with a developer.

4. Process for dyeing material comprising cellulose acetate, said process comprising treating said materials with a base being an azo compound containing alphanaphthylamine as an end component,—said base being applied in the form of a solubilized modification prepared by pretreatment of said base with a solubilizing agent comprising a body of oily or fatty characteristics,—diazotizing said base within the materal and coupling with beta-hydroxy-naphthoic acid.

5. Process for dyeing materials comprising cellulose acetate, said process comprising treating said materials with a base being an azo compound containing alphanaphthylamine as an end component,—said base being applied in the form of a solubilized modification prepared by pretreatment of said base with a solubilizing agent comprising sodium sulphoricinoleate,—diazotizing said base within the material and coupling with a developer.

6. Process for dyeing materials comprising cellulose acetate, said process comprising treating said materials with a base being an azo compound containing alphanaphthylamine as an end component,—said base being applied in the form of a solubilized modification prepared by pretreatment of said base with a solubilizing agent comprising sodium sulphoricinoleate,—diazotizing said base within the material and coupling with beta-hydroxy-naphthoic acid.

7. Process for dyeing materials comprising cellulose acetate, said process comprising treating said materials with a base of the benzene-azo-alphanaphthylamine series, diazotizing said base within the material and coupling with a developer.

8. Process for dyeing materials comprising cellulose acetate, said process comprising treating said materials with a base of the benzene-azo-alphanaphthylamine series, diazotizing said base within the material and coupling with beta-hydroxy-naphthoic acid.

9. Process for dyeing materials comprising cellulose acetate, said process comprising treating said materials with a base of the benzene-azo-alphanaphthylamine series,—said base being applied in the form of a solubilized modification prepared by pretreatment of said base with a solubilizing agent comprising a body of oily or fatty characteristics,—diazotizing said base within the material and coupling with a developer.

10. Process for dyeing materials comprising cellulose acetate, said process comprising treating said materials with a base of the benzene-azo-alphanaphthylamine series,—said base being employed in the form of a solubilized modification prepared by pretreatment of said base with a solubilizing agent comprising a body of oily or fatty characteristics,—diazotizing said base within the material and coupling with beta-hydroxy-naphthoic acid.

11. Process for dyeing materials comprising cellulose acetate, said process comprising treating said materials with a base of the benezene-azo-alphanaphthylamine series,—said base being applied in the form of a solubilized modification prepared by pretreatment of said base with a solubilizing agent comprising sodium sulphoricinoleate,—diazotizing said base within the material and coupling with a developer.

12. Process for the dyeing of materials comprising cellulose acetate, said process comprising treating said materials with a base of the benzene-azo-alphanaphthylamine series,—said base being applied in the form of a solubilized modification prepared by pretreatment of said base with a solubilizing agent comprising sodium sulphoricinoleate,—diazotizing said base within the material and coupling with beta-hydroxy-naphthoic acid.

13. Process for dyeing materials comprising cellulose acetate, said process comprising treating said materials with para-amido-benzene-azo-alphanaphthylamine, diazotizing the para-amido-benzene-azo-alphanaphthylamine within the material and coupling with a developer.

14. Process for dyeing materials comprising cellulose acetate, said process comprising treating said materials with para-amido-benzene-azo-alphanaphthylamine, diazotizing the para-amido-benzene-azo-alphanaphthylamine within the material and coupling with beta-hydroxy-naphthoic acid.

15. Process for dyeing materials comprising cellulose acetate, said process comprising treating said materials with para-amido-benzene-azo-alphanaphthylamine,—the para-amido-benzene-azo-alphanaphthylamine being applied in the form of a solubilized modification prepared by pretreatment of it with a solubilizing agent comprising a body of oily or fatty characteristics, diazotizing the para-amido-benzene-azo-alphanaphthylamine within the material and coupling with a developer.

16. Process for dyeing materials comprising cellulose acetate, said process comprising treating said materials with para-amido-benzene-azo-alphanaphthylamine,—the para-amido-benzene-azo-alphanaphthylamine being applied in the form of a solubilized modification prepared by pretreatment of it with a solubilizing agent comprising a body of oily or fatty characteristics,— diazotizing the para-amido-benzene-azo-alphanaphthylamine within the material and coupling with beta-hydroxy-naphthoic acid.

17. Process for dyeing materials comprising cellulose acetate, said process comprising treating said materials with para-amido benzene-azo-alphanaphthylamine,—the para-amido-benzene-azo-alphanaphthylamine being applied in the form of a solubilized modification prepared by pretreatment of it with a solubilizing agent comprising sodium sulphoricinoleate,—diazotizing the para-amido-benzene-azo-alphanaphthylamine within the material and coupling with a developer.

18. Process for dyeing materials comprising cellulose acetate, said process comprising treating said materials with para-amido-benzene-azo-alphanaphthylamine,—the para-amido-benzene-azo-alphanaphthylamine being applied in the form of a solubilized modification prepared by pretreatment of it with a solubilizing agent comprising sodium sulphoricinoleate,—diazotizing the para-amido-benzene-azo-alphanaphthylamine within the material and coupling with beta-hydroxy-naphthoic acid.

In testimony whereof I have hereunto subscribed my name.

GEORGE HOLLAND ELLIS.